United States Patent [19]

Doi et al.

[11] Patent Number: 4,598,980
[45] Date of Patent: Jul. 8, 1986

[54] OBJECTIVE OPTICAL SYSTEM FOR ENDOSCOPE

[75] Inventors: Yoshikazu Doi; Hitoshi Miyano; Toshiro Kishikawa; Yasumasa Sunaga, all of Ohmiya, Japan

[73] Assignee: Fuji Photo Optical Co., Ltd., Tokyo, Japan

[21] Appl. No.: 631,867

[22] Filed: Jul. 18, 1984

[30] Foreign Application Priority Data

Jul. 23, 1983 [JP] Japan ................... 58-134872

[51] Int. Cl.⁴ .................. G02B 13/04; G02B 23/24
[52] U.S. Cl. ................................................. 350/445
[58] Field of Search ......................................... 350/445

[56] References Cited

U.S. PATENT DOCUMENTS 3,663,092  5/1972  Schlegel ........................... 350/445
4,037,938  7/1977  Yamashita et al. .............. 350/445

Primary Examiner—John K. Corbin
Assistant Examiner—Rebecca D. Gass
Attorney, Agent, or Firm—Pasquale A. Razzano

[57] ABSTRACT

An objective optical system for an endoscope comprises a retrofocus objective lens assembly consisting of a front-stage diverging lens unit, an aperture diaphragm, a rear-stage converging lens unit, and a prism positioned in this sequence, and a self-scanning solid state image pickup device positioned at the image formation surface of said objective lens assembly. The objective lens assembly satisfies the conditions $0.8 < |f1|/f \leq 1.5$, $1 < f2/f \leq 1.5$, and $Np > 1.7$, where f denotes the resultant focal length of the whole assembly, f1 denotes the resultant focal length of the front-stage diverging lens unit, f2 designates the resultant focal length of the rear-stage converging lens unit, and Np designates the refractive index of the prism.

5 Claims, 5 Drawing Figures

OBJECTIVE OPTICAL SYSTEM FOR ENDOSCOPE

BACKGROUND OF THE INVENTION

1. Field of the Invention

This invention relates to an objective optical system for an endoscope using a solid state image pickup device as an imaging device.

2. Description of the Prior Art

Solid state image pickup devices comprising a charge transfer device having a self-scanning function, such as a charge coupled device (CCD), and a plurality of light receiving devices positioned in the matrix form on a plate have heretofore been put into practice. The solid state image pickup devices have been reduced to a chip size of several millimeters square.

In view of the above circumstances, an attempt has been made to incorporate the solid state image pickup device into the end portion of an endoscope as disclosed, for example, in Japanese Unexamined Patent Publication No. 55(1980)-54933. FIG. 1 is a schematic view showing the conventional objective optical system comprising the solid state image pickup device for an endoscope. In the conventional objective optical system, a solid state image pickup device 1 and an objective lens assembly Lo are positioned so that a light receiving section 1A of the solid state image pickup device 1 is normal to the optical axis O of the objective lens assembly Lo and coincides with the image formation surface of the objective lens assembly as indicated by the mark X. Though the configuration of the objective optical system is simple, problems arise when the objective lens assembly is used at the end portion of an endoscope. More specifically, since the end portion of the endoscope is inserted into body cavities such as the gullet, the stomach, the intestine and the trachea, it is desired to decrease the outer diameter of the end portion of the endoscope. However, in the configuration of FIG. 1, it is impossible to decrease the outer diameter of the end portion of the endoscope appreciably due to the outer dimension of the solid state image pickup device 1. Further, when the solid state image pickup device 1 is provided with a charge accumulating section 1B for temporarily accumulating signal charges in addition to the light receiving section 1A as shown in FIG. 1, the problem with regard to the outer diameter of the end portion of the endoscope becomes worse. Also, since an illumination light guide, air and water feed pipes, a forceps channel, and the like must be positioned in the endoscope body, the arrangement of the solid state image pickup device 1 as shown in FIG. 1 markedly interferes with design flexibility.

FIG. 2 is a schematic view showing an example of he objective optical system to which the present invention pertains. The problems mentioned above can be eliminated by positioning the solid state image pickup device 1 in the longitudinal direction of the endoscope as shown in FIG. 2. The objective optical system comprises an optical path converting prism 2 for turning the optical path O. In this configuration, it is possible to prevent the end portion of the endoscope from becoming large due to the outer dimension of the solid state image pickup device 1.

In the objective optical system for the endoscope, a wide angle optical system is utilized to widen the field of view. Widening of the field of view is realized by a retrofocus optical system consisting, for example, of a front-stage diverging lens unit LA and a rear-stage converging lens unit LB as shown in FIG. 2. However, in the configuration of FIG. 2, since the optical path converting prism 2 is positioned between the objective lens assembly Lo and the solid state image pickup device 1, it is necessary to increase the back focal length of the optical system. Further, in order to realize the configuration of FIG. 2, the exit pupil of the objective optical system should preferably be positioned on the object side with respect to the exit plane of the rear-stage converging lens unit LB for the purpose of decreasing the outer diameter of the front-stage diverging lens unit LA which contributes to increasing the field of view and decreasing the size of the optical path converting prism 2. It is also desired to minimize the longitudinal dimension of the objective optical system.

SUMMARY OF THE INVENTION

The primary object of the present invention is to provide an objective optical system suitable for an endoscope using a solid state image pickup device built in the end portion.

Another object of the present invention is to provide an objective optical system for an endoscope, which covers a wide field of view and minimizes the outer diameter of the end portion of the endoscope.

The specific object of the present invention is to provide an objective optical system for an endoscope, which exhibits a long back focal length suitable for the insertion of an optical path converting prism and which is small in size.

The objective optical system for an endoscope in accordance with the present invention comprises a retrofocus objective lens assembly consisting of a front-stage diverging lens unit, an aperture diaphragm, a rear-stage converging lens unit, and a prism positioned in this sequence, and a self-scanning solid state image pickup device positioned at the image formation surface of said objective lens assembly, said objective lens assembly satisfying the conditions $$0.8 < |f1|/f \leq 1.5 \tag{1}$$

$$1 < f2/f \leq 1.5 \tag{2}$$

$$Np > 1.7 \tag{3}$$

where f denotes the resultant focal length of the whole assembly, f1 denotes the resultant focal length of the front-stage diverging lens unit, f2 designates the resultant focal length of the rear-stage converging lens unit, and Np designates the refractive index of the prism.

The objective optical system in accordance with the present invention is suitable for an endoscope using a solid state image pickup device built in the end portion. It comprises a wide angle objective lens assembly and still minimizes the outer diameter of the end portion of the endoscope. Further, the objective optical system exhibits a long back focal length suitable for the insertion of the optical path converting prism and still realizes a compact configuration. The objective optical system of the present invention can be effectively applied not only in endoscopes for insertion into a living body but also in industrial endoscopes for insertion into machines or the like.

DESCRIPTION OF THE PREFERRED EMBODIMENTS

The present invention will hereinbelow be described in further detail with reference to the accompanying drawings.

Figure 3:
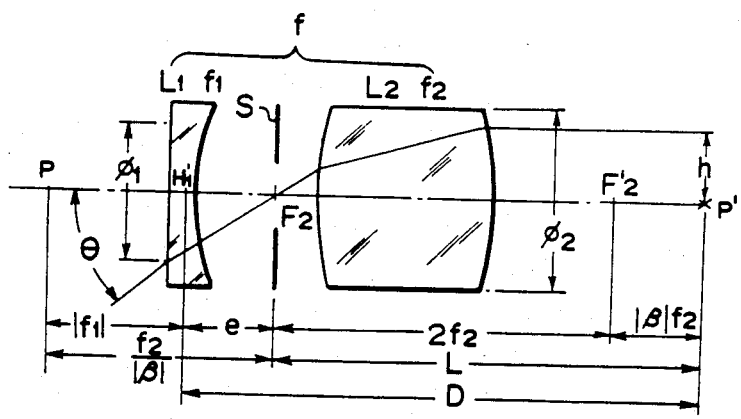
FIG. 3 is a schematic view showing the basic configuration of the objective lens assembly in an embodiment of the objective optical system in accordance with the present invention.

Referring to FIG. 3, the objective lens assembly comprises a front-stage diverging lens unit L1 and a rear-stage converging lens unit L2. The reference characters P and P' respectively designate the object point and the image point.

In general, the resultant focal length f of the objective lens assembly constituted by two stages as shown in FIG. 3 is represented by $$(1/f) = (1/f1) + (1/f2) - (d/f1f2) \quad (1)$$

where f1 designates the focal length of the front-stage diverging lens unit, f2 denotes the focal length of the rear-stage converging lens unit, and d denotes the distance between the principal points of the front-stage diverging lens unit and the rear-stage converging lens unit.

On the other hand, from FIG. 3, the following formula is derived.

$$|f1| |\beta| = f \quad (2)$$

where $\beta$ denotes the image formation magnification of the rear-stage converging lens unit, f1 denotes the focal length of the front-stage diverging lens unit, and f designates the focal length of the whole assembly.

When the distance between the rear principal point H1' of the front-stage diverging lens unit L1 and the front focal point F2 of the rear-stage converging lens unit L2 is e (e>0), then the distance e is represented by $$e = \frac{f2}{|\beta|} - |f1| = |f1| \left( \frac{f2}{f} - 1 \right) \quad (3)$$

From Formulae (2) and (3), the outer diameter $\phi 1$ of the front-stage diverging lens unit L1 is represented by $$\phi 1 = 2 \frac{h}{f2} e = 2h \frac{|f1|}{f} \left( 1 - \frac{f}{f2} \right) \quad (4)$$

On the other hand, the back focal length of the objective lens assembly is related to $|\beta|$ f2.

In Formula (4), the dimension h of the image formation surface is predetermined with respect to the dimension of the effective image surface of the solid state image pickup device. Therefore, the factors determining the outer diameter $\phi 1$ of the front-stage diverging lens unit L1 are $|f1|/f$ and f/f2. In order to decrease the outer diameter $\phi 1$ of the front-stage diverging lens unit L1, $|f1|/f$ should be as small as possible. However, as clear from Formula (2), when $|f1|/f$ is decreased, $|\beta|$ increases in inverse proportion thereto. This means that the entire length D of the objective lens assembly increases. That is, when the objective lens assembly is incorporated in the end portion of the endoscope, the end portion becomes long and causes the patient discomfort or pain. Therefore, it is not practical to infinitely decrease $|f1|/f$. Further, since the outer diameter is limited, sufficient brightness of the edge of the image field cannot be obtained when the entire length D of the objective lens assembly becomes long.

For the reasons as mentioned above, $|f1|/f$ should preferably be larger than 0.8. Also, in order not to increase the outer diameter $\phi 1$ of the front-stage diverging lens unit L1 nor markedly shorten the back focal length of the objective lens assembly, $|f1|/f$ should preferably be $|f1|/f \leq 1.5$. Accordingly, as the first condition for decreasing the outer diameter $\phi 1$ of the front-stage diverging lens unit L1 and obtaining an appropriate back focal length of the objective lens assembly, the following condition should be satisfied.

$$0.8 < |f1|/f \leq 1.5$$

As the second factor for decreasing the outer diameter $\phi 1$ of the front-stage diverging lens unit L1, f/f2 should be large, i.e. f2/f should be small.

However, from Formula (3), 1<f2/f. Also, in order to maintain the outer diameter $\phi 1$ of the front-stage diverging lens unit L1 small and not to increase the entire length D of the objective lens assembly too much, the condition f2/f $\leq 1.5$ should be satisfied. Accordingly, as the second condition for decreasing the outer diameter $\phi 1$ of the front-stage diverging lens unit L1 and preventing the entire length D of the objective lens assembly from becoming too long, the following condition should be satisfied.

$$1 < f2/f \leq 1.5$$

Figure 1:
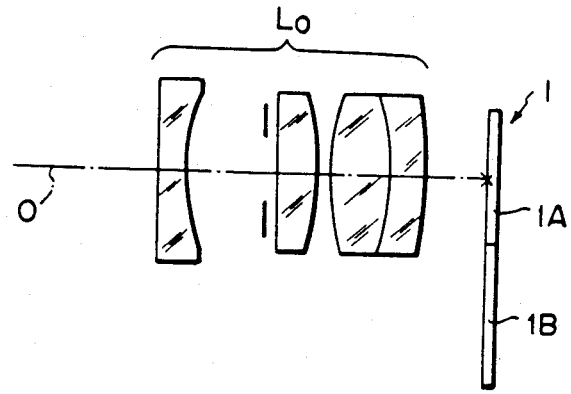
FIG. 1 is a schematic view showing the conventional objective optical system.
Figure 2:
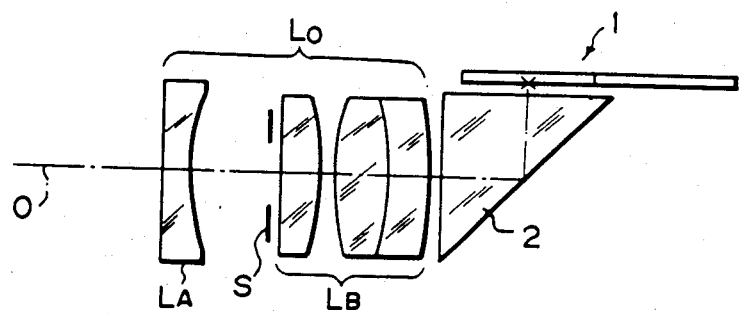
FIG. 2 is a schematic view showing an example of the objective optical system to which the present invention pertains.

Further, in order to minimize the size of the end portion of the endoscope, the refractive index Np of the optical path converting prism 2 in FIG. 2 should be increased to reduce the optical path length. Accordingly, as the third condition for decreasing the optical path length and readily achieving total reflection of the light beam impinging upon the prism 2 via the objective lens system Lo in FIG. 2 at the reflection surface of the prism 2, thereby efficiently guiding the light beam to the image formation surface, the following condition should be satisfied.

$$Np > 1.7$$

In FIG. 3, an aperture diaphragm S is positioned near the front focal point of the rear-stage converging lens unit L2 and is not far apart from the telecentric system. Therefore, when the optical path converting prism is positioned on the rear side of the lens unit, it is possible to decrease the size of the prism, particularly the size of the entrance surface.

In experiments conducted by the inventors, good results were obtained by adjusting $|f1|/f$, f2/f and Np in the first, second and third conditions respectively to 1.16, 1.40, and 1.883. Also, a back focal length of 1.46f and an angle of view of 115° were attained.

In the configuration of FIG. 2, when the solid state image pickup device 1 and the exit surface of the prism 2 are close to each other, the exit surface of the prism 2 becomes close to the image formation surface and, therefore, the image quality is readily deteriorated by dust, flaws, or the like on the exit surface of the prism 2. Therefore, in the case where the solid state image pickup device 1 and the exit surface of the prism 2 are close to each other, these members should preferably be closely contacted with each other by use of an adhesive to prevent adverse effects of dust, flaws, or the like. In this case, when the refractive index of the adhesive is considered, it is possible to decrease unnecessary reflected light from the exit surface of the prism 2 and prevent the image quality from deteriorating due to ghost and flare.

In the objective optical systems as shown in FIGS. 2 and 3 in accordance with the present invention, adjustment of the focusing point can be conducted by moving the front-stage diverging lens unit or the rear-stage converging lens unit in the optical axis direction. It is also possible to adjust the focusing point by dividing the lens unit into a plurality of lens sections, and moving some lens sections.

Figure 4:
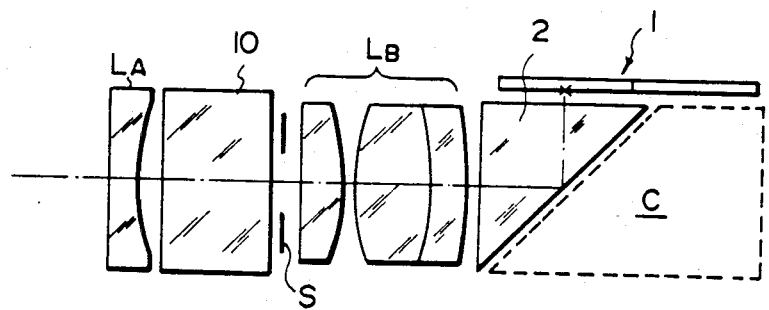
FIGS. 4 and 5 are schematic views showing further embodiments of the objective optical system in accordance with the present invention.
Figure 5:
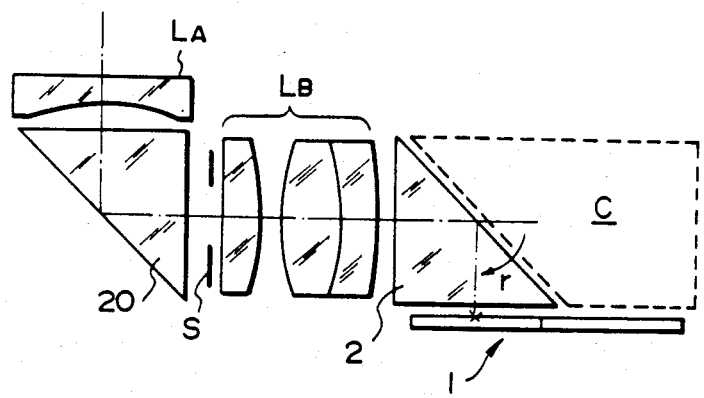

FIGS. 4 and 5 shows further embodiments of the objective optical system in accordance with the present invention. In FIG. 4, a plane-parallel plate 10 is inserted between the front-stage diverging lens unit LA and the rear-stage converging lens unit LB, thereby increasing the field of view without increasing the outer diameter of the front-stage diverging lens unit LA. In FIG. 5, a rectangular prism 20 is used to achieve the same effect as that of the embodiment of FIG. 4 and to provide an arrangement adapted to a lateral viewing endoscope. In FIGS. 4 and 5, a driving circuit section for driving the solid state image pickup device 1, a converter for A/D converting the signal output, when necessary, or other circuit element can be positioned in the space as indicated by the broken line C on the rear side of the optical path converting prism 2. Further, in the aforesaid embodiments, the optical path conversion angle (angle r in FIG. 5) of the optical path converting prism 20 is 90°. However, the optical path conversion angle is not limited to 90° and may be changed according to the arrangement of the optical axis and the solid state image pickup device.

In the embodiments as shown in FIGS. 2 and 4, since a single (odd) reflection surface is used, a reverse image is obtained on the solid state image pickup device. However, it is possible to convert the reverse image into an erect image by electrical processing and display or record an erect image.

We claim:

1. An objective optical system for an endoscope, which comprises a retrofocus objective lens assembly consisting of, a front-stage diverging lens unit, an aperture diaphragm, a rear-stage converging lens unit, and a prism positioned in this sequence along the path of the light beam from the object to the image formation surface of said objective lens assembly, and a self-scanning solid state image pickup device positioned at the image formation surface of said objective lens assembly and approximately in parallel with the longitudinal direction of the objective optical system, said objective lens assembly satisfying the conditions $$0.8 \leq |f1|/f \leq 1.5 \quad (1)$$

$$1 < f2/f \leq 1.5 \quad (2)$$

$$Np > 1.7 \quad (3)$$

where f denotes the resultant focal length of the whole assembly, f1 denotes the resultant focal length of the front-stage diverging lens unit, f2 designates the resultant focal length of the rear-stage converging lens unit, and Np designates the refractive index of the prism.

2. An objective optical system for an endoscope as defined in claim 1 wherein said aperture diaphragm is positioned near the front focal point of said rear-stage converging lens unit.

3. An objective optical system for an endoscope as defined in claim 1 wherein the exit surface of said prism and said solid state image pickup device are closely contacted by use of an adhesive.

4. An objective optical system for an endoscope as defined in claim 1 wherein a plane-parallel plate is positioned between said front-stage diverging lens unit and said rear-stage converging lens unit.

5. An objective optical system for an endoscope as defined in claim 1 wherein said front-stage diverging lens unit comprises a right angle prism.

* * * * *